United States Patent [19]

Sato

[11] 4,419,917
[45] Dec. 13, 1983

[54] POWER SAVING DEVICE FOR AN ELECTRONIC MUSICAL INSTRUMENT

[75] Inventor: Kunio Sato, Houya, Japan

[73] Assignee: Casio Computer Co., Ltd., Tokyo, Japan

[21] Appl. No.: 427,129

[22] Filed: Sep. 29, 1982

Related U.S. Application Data

[63] Continuation of Ser. No. 185,411, Sep. 9, 1980, abandoned.

[30] Foreign Application Priority Data

Sep. 13, 1979 [JP] Japan ................................. 54-116685

[51] Int. Cl.³ .............................................. G10H 1/00
[52] U.S. Cl. ..................................... 84/1.01; 364/707
[58] Field of Search ...................... 84/1.01, 1.03, 1.24; 364/707; 307/126

[56] References Cited

U.S. PATENT DOCUMENTS 3,610,799 10/1971 Watson ............................... 84/1.01
3,809,786 5/1974 Deutsch .............................. 84/1.01
4,158,230 6/1979 Washizuka et al. ................. 364/707
4,285,043 8/1981 Hashimoto et al. ................. 364/707

Primary Examiner—F. W. Isen
Attorney, Agent, or Firm—Frishauf, Holtz, Goodman and Woodward

[57] ABSTRACT

A power saving device for an electronic musical instrument in which when the electronic musical instrument is idle, or no key operation by an operator takes place for a given period of time, a power source is automatically turned off to thereby prevent wasteful power consumption.

11 Claims, 5 Drawing Figures

POWER SAVING DEVICE FOR AN ELECTRONIC MUSICAL INSTRUMENT

This is a continuation of application Ser. No. 185,411 filed Sept. 9, 1980 now abandoned.

BACKGROUND OF THE INVENTION

The present invention relates to a power saving device for an electronic musical instrument.

Recently, various electronic musical instruments such as electronic organs and electronic pianos have been developed. With remarkable progress in electronics, digital technology and the semiconductor field, small-sized, portable, battery-driven electronic musical instruments have become practical. The conventional electronic musical instrument, when the power source is turned on, has continuous power source supply to respective circuit portions comprised of LSI, for example, contained in the electronic musical instrument devices until the power source is turned off. In such a circuit arrangement, when a player fails to turn off the power source switch or when a performance of a musical piece is interrupted, the power is wastefully consumed. Particularly in case of the battery-driven electronic musical instrument it damages the battery to shorten its life, thus requiring more frequent replacement of the battery.

Accordingly an object of the present invention is to provide a power saving device for an electronic musical instrument in which the power source is automatically turned off to save power when no key operation is continued for a given period of time or more.

SUMMARY OF THE INVENTION

To achieve the above object, there is provided a power saving device of an electronic musical instrument comprising:

manual operating means for supplying power to the members forming the electronic musical instrument;

detecting means for detecting that the electronic musical instrument is idle for a given period of time after the power is turned on by the manual operating means; and control means for automatically turning off the power supply to the members in response to a detecting signal of the detecting means.

With such an arrangement, when a player fails to turn off the power source switch or when a performance is interrupted, the power source is automatically turned off after a given time to prevent wasteful consumption of power. Particularly, in case of a battery-driven electronic musical instrument, it advantageously allows the battery to have an elongation of its life and to be subject to less frequent replacement thereof.

DETAILED DESCRIPTION

Figure 1:
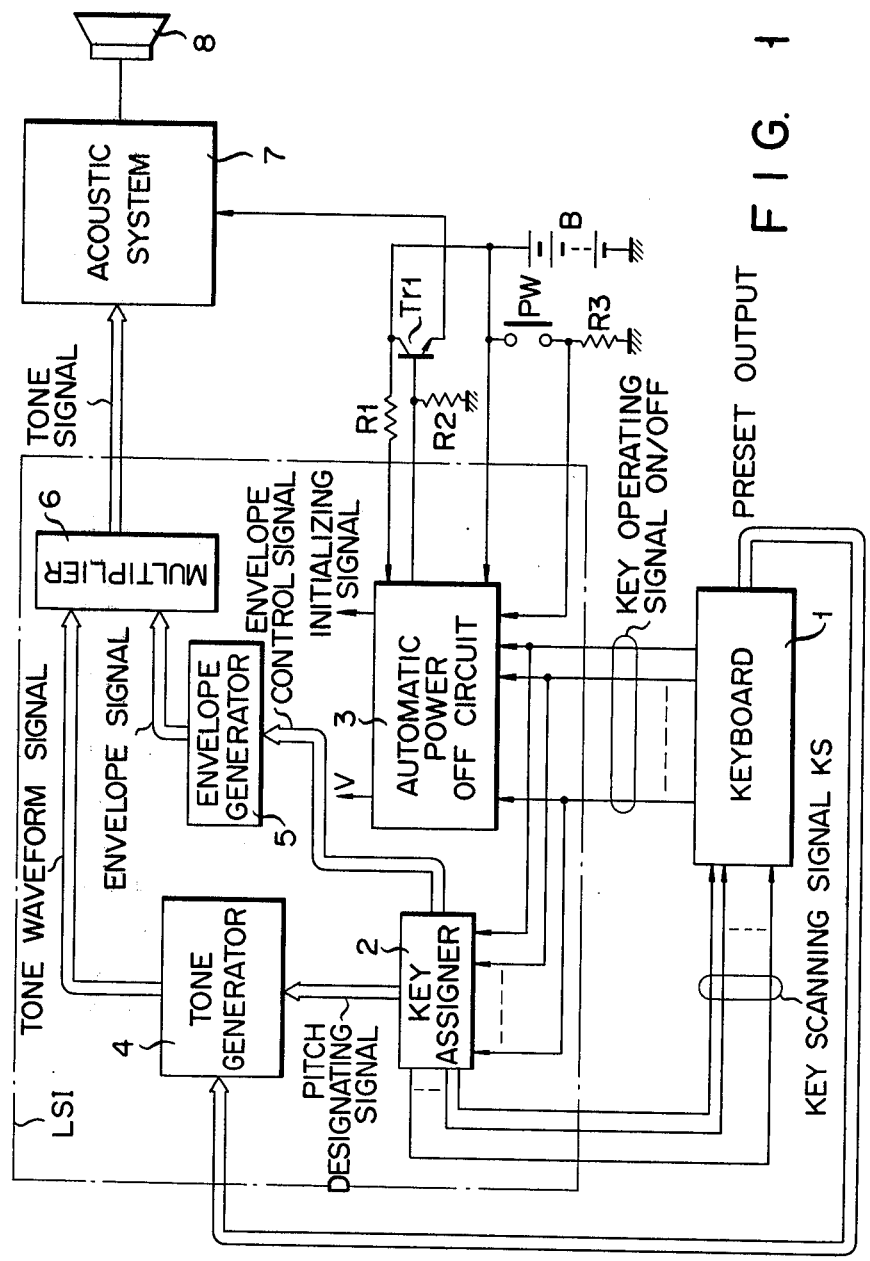
FIG. 1 is a block diagram partially illustrating a circuit diagram of an electronic musical instrument according to a first embodiment of the invention.

Reference is made to FIG. 1 illustrating a first embodiment of an electronic musical instrument according to the invention. The electronic musical instrument of the present embodiment is of the battery-driven type and uses a battery B as its electric power source. In the figure, a keyboard 1 has an array of keys for selectively designating a tone with a pitch and also a drawbar for setting tone color and a volume controller for sound intensity adjustment. The keyboard 1 is scanned by a key scanning signal KS from a key assigner 2. A key operating signal ON/OFF obtained by the scanning is applied to the key assigner 2 and an automatic power off circuit 3. The key assigner 2 produces a pitch designating signal for designating pitch and an envelope control signal for controlling volume in accordance with the operation signal ON/OFF keyed in. The former signal produced is applied to a tone generator 4 whereas the latter is applied to an envelope generator 5. The automatic power-off circuit 3 counts the time from the power-on by a power switch PW or the preceeding key operation to the next key operation in order to automatically turn off the power when the counted time reaches a given time, for example, 3 minutes. The details of the automatic power-off circuit 3 will be described later. The tone generator 4 receives outputs (a preset output) from the drawbar and the volume controller and modifies a tone with a pitch designated by the pitch designating signal thereby to produce a corresponding tone waveform signal for application to a multiplier 6. The envelope generator 5 produces an envelope signal corresponding to the envelope control signal and applies it to the multiplier 6. The multiplier 6 multiplies the tone waveform signal by the envelope signal to form a tone signal. The tone signal is amplified after being converted into a tone signal of analog quantity by an acoustic system 7 and is applied to a speaker 8 to sound it. The circuits 2 to 6 are constructed by LSI and synchronized in operation by a basic clock of an oscillator (not shown).

Figure 2:
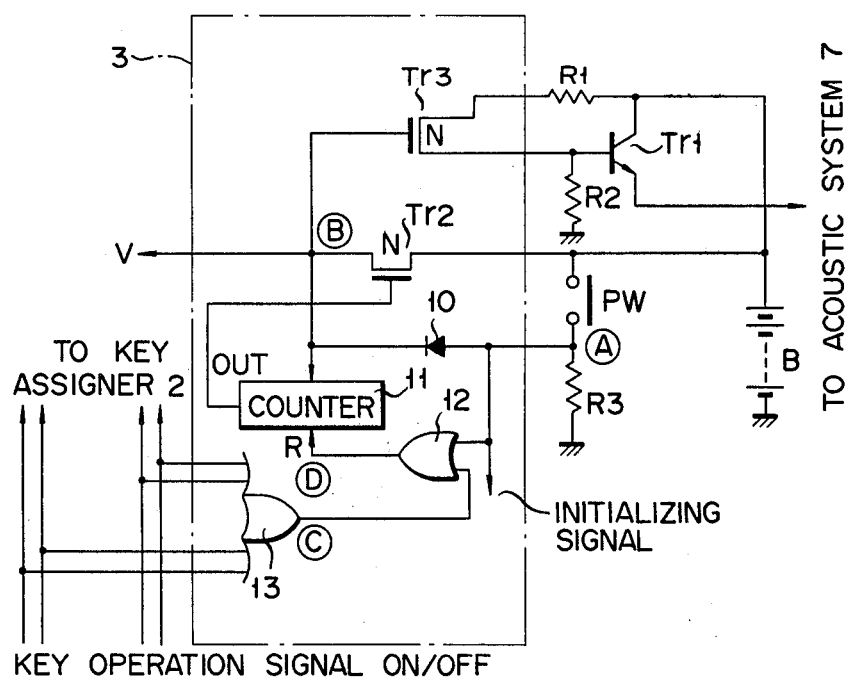
FIG. 2 is a circuit diagram of an automatic power-off circuit and the associated circuitry of the musical instrument shown in FIG. 1.

The details of the automatic power off circuit 3 and its related circuitry will be described referring to FIG. 2. A negative terminal of the battery B is connected to ground. A positive terminal of the battery is connected to one end of a power switch PW, a collector terminal of an NPN transistor $Tr_1$, one end of a resistor $R_1$ and a drain terminal of an N-channel MOS transistor $Tr_2$. The other terminal (at point A) of the power switch PW is connected to ground through a resistor $R_3$, to a driven-voltage control input terminal of a counter 11 through a diode 10 and to a reset input terminal R of a counter 11 through an OR gate 12. The power switch PW is a feedback type switch. The other end of the resistor $R_1$ is connected to a drain terminal of an N-channel MOS transistor $Tr_3$. A source terminal of the transistor $Tr_3$ is connected to a base terminal of the transistor $Tr_1$ and also connected to ground through a resistor $R_2$. An emitter terminal of the transistor $Tr_1$ is connected to the acoustic system 7 to drive it by an output current of the transistor $Tr_1$. An output terminal OUT of the counter 11 is connected to a gate terminal of the transistor $Tr_2$. A source terminal of the transistor $Tr_2$ is connected to the drive voltage input terminal of the counter 11 and the gate terminal of the transistor $Tr_3$. With such an arrangement, through the operation of the counter 11, or for a period until the contents of the counter 11 is equal to 3 minutes, both transistor $Tr_2$ and $Tr_3$ are turned on to obtain a driven voltage V for the LSI and a drive voltage for the acoustic system 7. The counter 11 receives a signal of a given frequency from the oscillator to perform the time counting operation. The key operating signal ON/OFF from the keyboard 1 is applied to the reset input terminal R through OR gates 13 and 12. With this connection, the counter 11 is reset every time a key is operated. The source terminal of the transistor $Tr_2$ will be called a point B; an output terminal of the OR gate 13 a point C; and an output terminal of the OR gate 12 a point D. A pulse produced from the point A at the time of power-on will be called an initializing signal.

Figure 3:
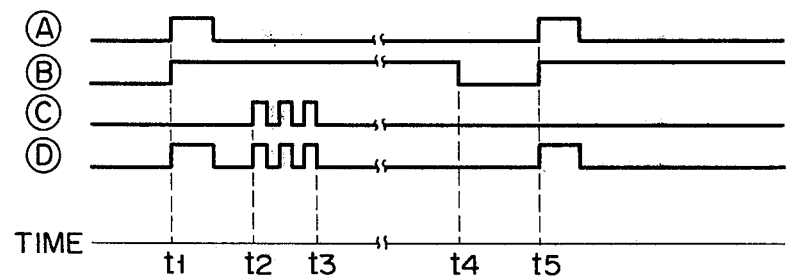
FIG. 3 is a time chart useful in explaining the operation of the musical instrument shown in FIG. 1.

The operation of the embodiment will be described referring now to FIG. 3 illustrating a time chart 3. When the power switch PW is turned on at time $t_1$ to start a performance, a single pulse is produced at the point A. The pulse as an initial designating signal is transferred to the circuits of the LSI thereby to reset the respective circuits to initialize them.

The pulse from power switch PW is also applied to the reset input terminal R of the counter 11 through the OR gate 12 to reset the counter 11. At the same time the pulse from power switch PW is simultaneously applied to the control input terminal of the counter 11 through the diode 10 to start the time counting operation of the counter 11. Then, the counter 11 starts its operation to produce a two-value logic level signal "1" ("High level") from the output terminal OUT of the counter. As a result, the transistor $Tr_2$ is turned on to produce a drive voltage V from the point B thereby to allow the operation of the circuits of the LSI. The transistor $Tr_3$ is turned on by the drive voltage V, and the transistor $Tr_1$ is also turned on, so that an emitter current of the transistor $Tr_1$ is applied to the acoustic system 7 thereby to allow the operation of the acoustic system 7.

When a first key is operated to start a performance at time $t_2$ before the counted time of the counter 11 reaches 3 minutes, a key operating signal ON/OFF from the keyboard 1 at that time is applied to the key assigner 2 and the power-off circuit 3. The key assigner 2, in response to the key operating signal ON/OFF, generates a pitch signal for the operated key and an envelope signal, and applies them to the tone generator 4 and the envelope generator 5. Accordingly, a tone waveform signal is outputted from the tone generator 4 and an envelope signal from the envelope generator 5. Receiving both the signals, the multiplier 6 multiplies them to produce the tone signal and transfers it to the acoustic system 7. A tone with a pitch corresponding to the operated key is applied to the speaker to sound it at time $t_2$. In the automatic power-off circuit 3, the key operating signal ON/OFF produced at time $t_2$ is applied to the reset input terminal R of the counter 11 through the OR gates 13 and 12 thereby to reset the counter 11 and to start again a new time count operation.

Similarly, for the operations of second and third keys, the operation as mentioned above is performed, a tone with the pitch corresponding to the operated key is produced from the sound speaker 8, and the counter 11 is reset for each key operation. The time-counting operation is newly started every key operation. In case that after the operation by the third key operation is completed at time $t_3$ and a performance is interrupted at the instant that the counter 11 starts the time-count operation at time $t_3$, the drive voltage V is continuously applied to the respective circuits in the LSI until time $t_4$ that the counted time of the counter 11 reaches 3 minutes. Accordingly, the circuits of the LSI, the keyboard 1, the acoustic system 7 and the like are left in a stand-by state while being operable. At time $t_4$, the contents of the counter 11 reaches the 3 minutes, so that an output at the output terminal OUT of counter 11 becomes "0" ("Low" level). The transistor $Tr_2$ is in turn turned off to cut an output voltage of the battery B, thereby to interrupt the supply of the drive voltage V. The transistors $Tr_3$ and $Tr_1$ are subsequently turned off, the circuits of the LSI, the keyboard 1, the acoustic system 7 and the like all become inoperable and the automatic power-off state is set up, thus preventing wasteful power consumption.

When the power switch PW is turned on at time $T_5$ to resume the performance, the counter 11 is reset by a pulse outputted at the point A and simultaneously starts again the time-counting operation. Further, the transistors $Tr_2$, $Tr_3$ and $Tr_1$ are in turn turned on, so that the automatic power-off state is released to allow the normal performance.

Figure 4:
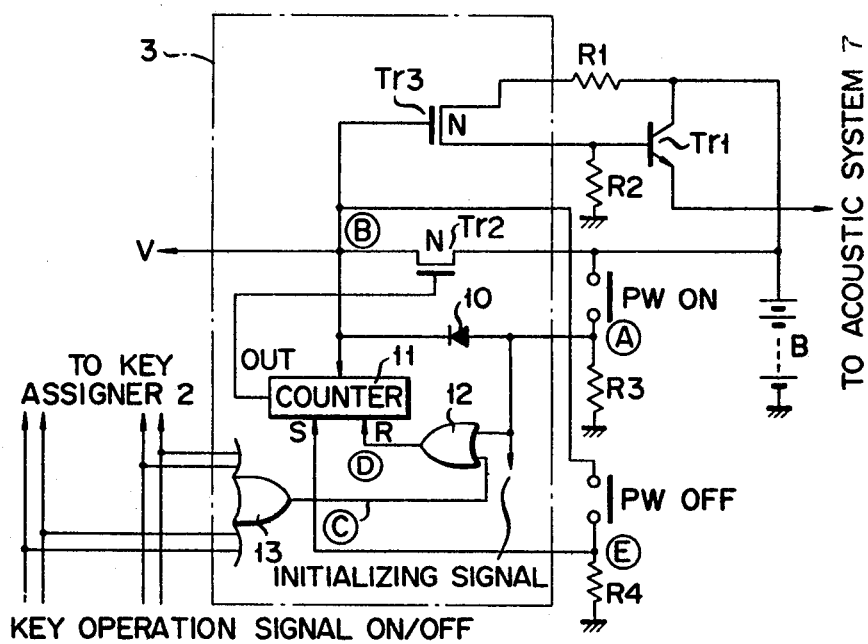
FIG. 4 is a circuit diagram of an automatic power-off circuit and the associated circuitry according to a second embodiment of the invention.
Figure 5:
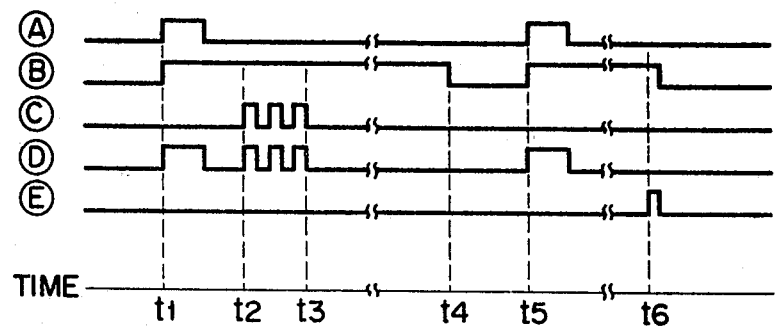
FIG. 5 is a time chart useful in explaining the operation of the embodiment shown in FIG. 4.

Referring FIGS. 4 and 5, there is shown a second embodiment of the power saving device according to the present invention. Like reference numerals are used to designate the like portions of the first embodiment as described above. The overall construction of this embodiment is substantially the same as that of the first embodiment, except for the automatic power-off circuit 3. Accordingly no description thereof will be given.

The embodiment of FIG. 4 uses a power-on switch PW ON and a power-off switch PW OFF instead of the power switch PW of the first embodiment. The connection of the power switch PW ON is the same as that of the power switch PW of the first embodiment. One end of the power-off switch PW OFF is connected to the point B. The other end thereof (referred to as a point E) is connected to ground through the resistor $R_4$ and also to the set terminal of the counter 11.

As in the first embodiment, the operation of the power-on switch PW ON renders the musical instrument operable and the subsequent key operations reset the counter 11 for each operation. Therefore no description of such will be given (see time chart of time $t_1$ to $t_4$ shown in FIG. 5).

In case that a performance is made after power on at time $t_5$ and then the power switch PW OFF is depressed at time $t_6$, a level "1" at point B is applied to the set terminal S of the counter 11 through the power-off switch PW OFF (see a level change at point E shown in FIG. 5). Accordingly, the output from the output terminal OUT of the counter 11 is forced to be a "0" level and a level at point B becomes "0". As a result, the supply of the drive voltage to the circuits in the LSI and the acoustic system 7 is stopped, to cause the instrument to be in a power-off state.

In the embodiment of FIG. 4, the digital circuit is powered off by cutting off the drive voltage. In a case where an LSI formed by C-MOS is used, an oscillating operation of the oscillator is stopped, when the counter 11 counts up the time, to stop the supply of clock signals to the circuits. In this way, the automatic power-off state may be realized. The automatic power-off state may be released through a key operation on the keyboard. In other words, this may be realized by turning on the transistor $Tr_2$ by a first key operation following the automatic power-off state. In this case, after power switch PW ON is turned on power is continuously supplied to the key assigner 2 so as to produce the scanning signal KS.

In the above-mentioned embodiments, the present invention is applied to a battery-driven musical instrument, but it is applicable also to a musical instrument driven by a general commercial power source. This leads to a saving of electric power.

What is claimed is:

1. A power saving device for an electronic musical instrument comprising:

a source of power;

tone generating means including at least one LSI chip for generating tone signals;

an acoustic system coupled to said tone generating means for converting said tone signals to audio signals;

a keyboard including a plurality of performance keys;

power-on switch means including first and second transistors, said power source switch means being coupled to said power source for supplying power to said tone generating means by means of said first transistor, and for supplying power to said acoustic system by means of said second transistor;

time-counting means for counting a given period of time from an initial state at the time of a power-on state set by said power-on switch means to a given time, and for generating a control signal at the end of said given period of time;

means coupled to said keyboard for setting said time-counting means to the initial state thereof everytime any key of said keyboard is depressed;

a power-off switch for generating said control signal when operated; and control means coupled to said time-counting means and to said power-off switch, and including means responsive to said control signal from said time-counting means or from said power off switch, for stopping the supply of power to both said tone generating means and to said acoustic system, by turning off said first and second transistors.

2. The power saving device of claim 1, wherein said source of power comprises a battery; and said control means includes means for stopping said supply of power from said battery.

3. The power saving device of claim 1 or 2, wherein said control means comprises a transistor.

4. The power saving device of claim 1, wherein said time-counting means generates said control signal when the count of said time-counting means reaches a given value.

5. The power saving device of claim 1 or 4, wherein said given period of time is a few minutes; and said time-counting means functions for said few minutes from the time said initial value thereof is set to said given time, and then produces said control signal.

6. The power saving device of claim 1, wherein said power-on switch is a manually operated switch.

7. The power saving device of claim 1 or 6, wherein said power-off switch is a manually operated switch and generates said control signal when manually operated.

8. The power saving device of claim 1, wherein said time-counting means comprises a counter having a "set" input terminal, said power-off switch being coupled to said "set" input terminal of said counter for causing said counter to generate said control signal of said time-counting means.

9. The power saving device of claim 1, wherein said second transistor is external of said LSI chip of said tone generating means.

10. The power saving device of claim 1 or 9, wherein said first transistor is formed in said LSI chip.

11. The power saving device of claim 1 or 9, wherein said control means includes a third transistor coupling said control signal at least to said second transistor for selectively turning on and off said second transistor in order to selectively supply power or cut off power to said acoustic system, respectively.

* * * * *

UNITED STATES PATENT AND TRADEMARK OFFICE
CERTIFICATE OF CORRECTION

PATENT NO. : 4,419,917
DATED      : December 13, 1983
INVENTOR(S) : Kunio SATO

It is certified that error appears in the above-identified patent and that said Letters Patent is hereby corrected as shown below:

COLUMN 1, line 18, after "portions" change "comprised of LSI,"

to --comprised of LSI devices,--;

COLUMN 1, lines 19-20, after "musical instrument" delete

"devices";

COLUMN 5 (claim 1), line 20, change "power source switch" to

--power-on switch--.

Signed and Sealed this

Twenty-second Day of May 1984

[SEAL]

Attest:

GERALD J. MOSSINGHOFF

*Attesting Officer*   *Commissioner of Patents and Trademarks*